United States Patent [19]
Wiebe

[11] Patent Number: 5,204,861
[45] Date of Patent: Apr. 20, 1993

[54] KEY TELEPHONE SYSTEM WITH ENHANCED CONNECTIVITY

[75] Inventor: Charles R. Wiebe, Stittsville, Canada

[73] Assignee: Northern Telecom Limited, Montreal, Canada

[21] Appl. No.: 672,032

[22] Filed: Mar. 19, 1991

[30] Foreign Application Priority Data

Jan. 31, 1991 [CA] Canada .................. 2035357-1

[51] Int. Cl.⁵ .............................. H04J 3/12
[52] U.S. Cl. .................. 370/110.1; 379/156
[58] Field of Search ............ 370/110.1, 62, 58.1,
370/85.11; 379/216, 210, 96, 156

[56] References Cited

U.S. PATENT DOCUMENTS

| | | | |
|---|---|---|---|
| 4,873,682 | 10/1989 | Irwin et al. | 370/62 |
| 4,958,369 | 9/1990 | Tsuchida | 379/156 |
| 5,003,580 | 3/1991 | Duong et al. | 379/96 |
| 5,014,269 | 5/1991 | Picandet | 370/110.1 |

Primary Examiner—Douglas W. Olms
Assistant Examiner—Shick Hom
Attorney, Agent, or Firm—Michael M. Sakovich

[57] ABSTRACT

A key telephone system which is operably responsive to digitally encoded service orders and instructions stored in a ROM of a switching facility in a local ISDN telephone exchange achieves enhanced connectivity by using a dedicated line that provides a digital signaling and supervision communications path which is exclusively an ISDN basic rate 0B+D teleservice channel. A key switch unit of the system is connected to the exchange by POTS lines to provide conventional voice analog services to a plurality of its subscriber stations. Interfacing the key switch unit with the teleservice channel, a personal computer translates data downloaded from the switching facility into instructions recognized by the unit and enables individual subscriber stations with enhanced service connectivity features while displaying such features on a display unit of each station.

16 Claims, 5 Drawing Sheets

KEY TELEPHONE SYSTEM WITH ENHANCED CONNECTIVITY

FIELD OF THE INVENTION

This invention relates to a key telephone system and to its method of operation wherein connectivity between the system and a local ISDN telephone exchange occurs via conventional telephone lines and, more particularly, wherein value added functions are optionally added to the system by means of out-of-band signaling.

BACKGROUND OF THE INVENTION

A continuing demand for improved telephone services in both voice and data telecommunications has resulted in various evolutionary trends, one of which is referred to as an integrated services digital network (ISDN) that features a wide range of voice and data applications in the same network. The ISDN concept emphasizes versatility which is apparent in the variety of applications that are supported thereby. This trend towards ISDN systems is especially noteworthy for its digital end-to-end connectivity that is achieved by extending digital technology to the user terminals of a telephone system.

Although ISDN versatility is extensive, substantial installation and operating costs of an ISDN system may be prohibitive for small business telephone subscribers. Moreover, because such costs are significant, users currently operating less sophisticated and possibly older equipment may be similarly prohibited from trading up to experience the broad capabilities of ISDN.

Key telephone systems have been popular with small business users because of increased connectivity features that are available to them at reasonable cost. A limitation of the system, however, resides in its need for switches and cabling because all available telephone features are effected through key switches. Consequently, at some point of growth development in a small business, inevitable limits will be imposed on its communications capability because of inadequate switching services. This would then necessitate a complete changeover to an ISDN system. However, connectivity between a key telephone system and a central office or local telephone exchange having ISDN capability would occur by way of plain ordinary telephone system (POTS) lines which are limited by a narrow bandpass characteristic. The amount of information that can be shared between the central office and the key telephone system is therefore correspondingly limited.

SUMMARY OF THE INVENTION

Having regard to the aforedescribed problems relating to connectivity limitations in a key telephone system, one provision of the present invention is to avoid the information sharing problem by utilizing an out-of-band signaling channel that would allow digitally encoded information to be passed bidirectionally between calling and called stations.

A further provision of the invention is to enable a key telephone system user to subscribe to various digital network telephone features, heretofore not available to the user.

Another provision of the invention is the simplified and economical addition of value added functions to a key telephone system without a concomitant extensive use of telephone cables.

Still another provision of the invention is the utilization of an ISDN basic rate access 0B+D teleservice channel as the out-of-band signaling channel.

Another provision of the invention supports a directory name display, heretofore not supported by the ISDN basic rate access 0B+D teleservice channel.

Yet another provision of the invention is apparatus that will function over ubiquitous transport networks.

The problems associated with the prior art may be substantially overcome and the foregoing provisions achieved by recourse to the invention which, in one aspect thereof, relates to a key telephone system having enhanced connectivity that is operably responsive to selected ones of digitally encoded instructions resident in memory means of switch means disposed in a central data and voice communication facility. The system comprises an analog communications path having one end terminated at an analog interface of the switch means and an opposite end terminated at a remote key switch unit having a visual display. A digital communications path is provided having one end terminated at a digital interface of the switch means and an opposite end terminated at a remote digital communications port of the key switch unit. Processor means communicating with the digital communications port and being operably responsive to predetermined digitally encoded instructions input thereto enable the key switch unit with corresponding service connectivity features and visually display the features on the visual display.

Another aspect of the invention relates to a method for providing enhanced connectivity features in a key telephone system, wherein the features are operably responsive to selected ones of digitally encoded instructions resident in memory means of switch means disposed in a central data and voice communication facility. The method comprises the steps of, establishing an analog communications path having one end terminated at an analog interface of the switch means and an opposite end terminated at a remote key switch unit having a visual display, establishing a digital communications path having one end terminated at a digital interface of the switch means and an opposite end terminated at a remote digital communications port of the key switch unit, communicating the digital communications port with an enabling input of processor means, communicating a controlling output of the processor means with an enabling input of the key switch unit, and applying digitally encoded instructions downloaded from the switch means to the processor means for enabling the key switch unit with corresponding service connectivity features and visually displaying the same on the visual display.

BRIEF DESCRIPTION OF THE DRAWINGS

The invention will now be more particularly described with reference to embodiments thereof shown, by way of example, in the accompanying drawings in which.

DETAILED DESCRIPTION OF THE PREFERRED EMBODIMENTS

Figure 1:
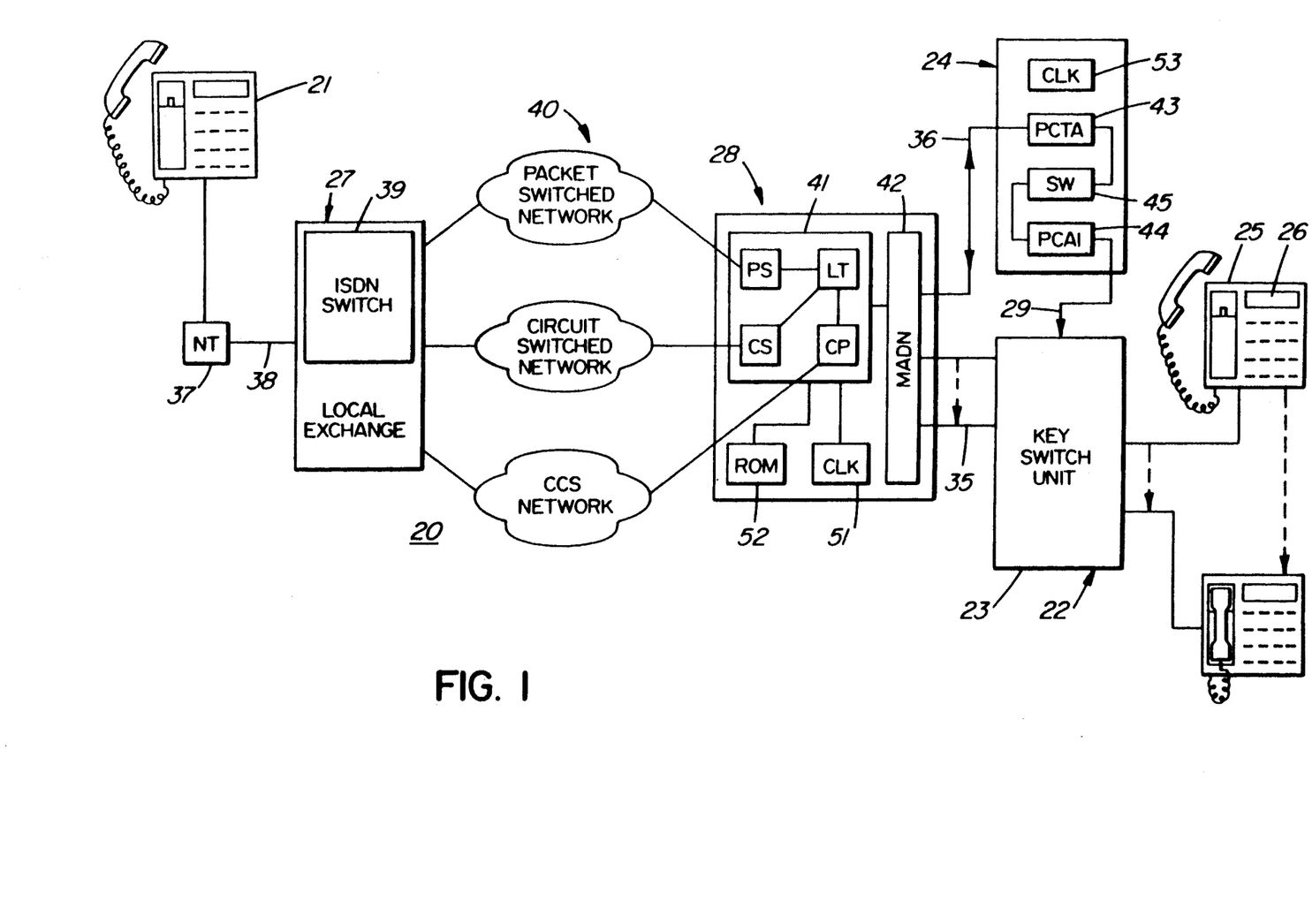
FIG. 1 is a block diagram of the invention utilized in a telecommunications system having a local and a corresponding remote terminal.

FIG. 1 illustrates an ISDN telecommunications system 20 that provides basic end-to-end connectivity between a calling station 21 and a called station 22. It will be understood that the station 22 comprises a key switch telephone system that includes a key switch unit (KSU) 23, a general purpose computer shown as a personal computer 24, and a plurality of station sets, referred to hereinbelow as stations 25, which are provided with visual displays 26 such as liquid crystal displays for example.

The system 20 includes a local exchange 27 at the calling end and provides the usual ISDN services through a ubiquitous transport network that includes packet switching, circuit switching and customer control of service features, hereinbelow described in greater detail.

Correspondingly, the called end of the system 20 comprises a local exchange 28 having a known, software controlled multiple address directory number module 42 that includes interfaces for both analog and digital telephone lines. It will be understood that the analog lines comprise a plurality of Centrex plain ordinary telephone service (POTs) lines 35 whereas a digital teleservice line 36 comprises a signaling and supervision communications path that is exclusively an ISDN basic rate access (BRA) 0B+D teleservice channel, referred to herein as the D-channel.

Initiating a call from the station 21 to the station 25 in the system 22 is conducted as a conventional ISDN circuit switched call. The call is processed in accordance with ISDN protocol which is based on the following recommendations published by, THE INTERNATIONAL TELEGRAPH AND TELEPHONE CONSULTATIVE COMMITTEE (CCITT), that appear in the Red Book, Volume III, Fascicle 111.5:

1. Recommendation I.430 Basic User-Network Interfaces—Layer 1 Specification

2. I.441(Q.921) ISDN User-Network Interface—Data Link Specification

3. I.451(Q.931) ISDN User-Network Interface—Data Link Layer Specification

Figure 2:
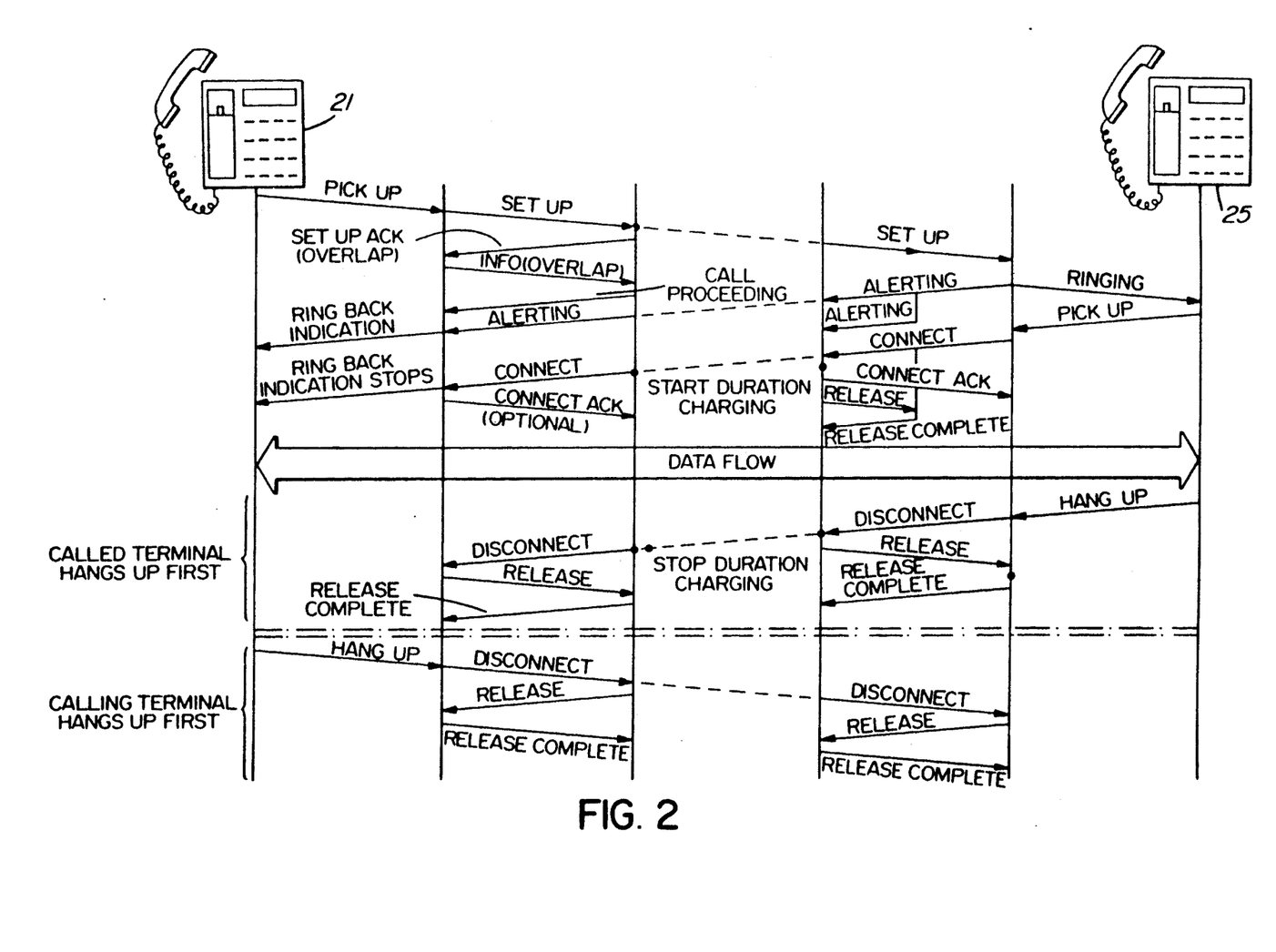
FIG. 2 is a flowchart showing a sequence of events for establishing end-to-end connectivity for data flow between a calling and a called station in the system of FIG. 1.

FIG. 2 illustrates diagrammatically the procedure that is followed for a simple circuit switched call. The call setup messages are provided in Q.931 and in equivalent messages that are proprietary to the system 22. In this respect, the system 22 represents the NORSTAR TM system which is a proprietary digital key telephone system of Northern Telecom Limited. The system is described in U.S. Pat. No. 4,893,310, which is entitled "Digital Key Telephone System" and is incorporated herein by reference. The patent issued Jan. 9, 1990, in the names of D. Robertson et al and is assigned to Northern Telecom Limited.

It will be observed that FIG. 2 illustrates the call-procedure from the point of the station 21 going off hook with the user dialing the number of the station 25, to the establishment of data flow between the exchanges 27 and 28 after the called station 25 initiates ringing and then goes off hook, which is designated as Pick up in FIG. 2.

Completion of the call is also indicated in FIG. 2, both in the case of the station 25 hanging up first and also when the station 21 hangs up first. These occurrences are related to the invention and will be described in greater detail in the specification hereinbelow to follow.

Reference to FIG. 1 reveals that the station 21 communicates with the exchange 27 via a network termination 37 and therefrom to a "U" interface 38 of the exchange 27. The exchange 27 includes central office switching apparatus in the form of a DMS 100 TM switch 39 which is a proprietary ISDN switch of Northern Telecom Limited.

A ubiquitous transport network 40 is disposed between the exchanges 27 and 28 and provides circuit switching of the call from the station 21. In combination with a second DMS 100 switch 41, located in the exchange 28, connectivity with the system 22 and the station 25 occurs via the POTS lines 35. Normally, the electrical characteristics of the POTS lines limit the amount of information that can be shared between the switch 41 and the system 22. By means of the embodiment of the invention herein described, however, signaling connectivity between the switch 41 and the system 22 is provided by the aforedescribed teleservice D-channel on the line 36. As a result, digitally encoded information may be communicated along the line 36 in half duplex fashion, which is to say in both directions, thereby permitting the addition of value added functions to the system 22 and its individual stations.

In accordance with a known software module 42, designated Multiple Appearance Directory Number (MADN) in FIG. 1, the output from the switch 41 is processed by the module 42 which establishes the relationship between the Call Appearances on the D-channel on the line 36 and the directory numbers on the analog Centrex POTS lines 35 connected to the KSU 23. The POTS lines 35 therefore comprise analog voice-channel links between the exchange 28 and the KSU 23 whereas the D-channel of the line 36 provides supplementary information regarding the call from the station 21. Thus, any number of POTS lines from the exchange 28 may be used, a limitation being only the corresponding number of POTS lines 35 available from the switch 41.

Association of the POTS lines 35 and the single line 36 in respect of Call Appearances is done by configuring the POTS lines 35 as Integrated Business Network lines. MADNs are provisioned such that the directory number of the first line in the lines 35 connected to the KSU 23 also appears on a first Call Appearance of the D-channel of the line 36. Correspondingly, the directory number of the second line of the POTS lines 35 leading to the KSU 23 appears on a second Call Appearance, and so on until all POTS lines are configured. As a result, each directory number of each POTS line 35 is unique. For the D-channel on the line 36, there can be a total of 63 directory numbers and features per terminal. The station 22 terminates the POTS lines 35, which are configured in the same manner as are central office lines at present.

As previously noted, the switch 41 signaling connectivity with the station 22 is provided via the D-channel on the line 36. Having regard to FIG. 1, it will be observed that the D-channel is terminated in the PC 24 by means of a BRA PC terminal adapter (PCTA) card 43. D-channel teleservice connectivity with the system 22 is provided from the card 43 to a control input 29 of the system 22 via a NORSTAR PC application interface (PCAI) card 44.

It will be understood from the foregoing description that the PC 24 terminates both the BRA and NOR-STAR D-channels. However, protocol conversion is required to connect both BRA and NORSTAR signaling and is achieved by means of bridging software shown as a module 45, hereinbelow described in further detail. Configured by the software, the PC 24 maps the call appearances on the D-channel of the line 36 to the line appearances, namely the corresponding directory numbers, on the POTS lines 35. Accordingly, incoming teleservice messages on the line 36, such as calling line identification, are routed by the KSU 23 to the station 25 being notified.

Since it appears likely that 63 key/lamp pairs will be insufficient for the KSU 23 to function effectively, provision in the PC 24 may be made to allow two terminal end point identifiers (TEIs), not shown, per loop, thus allowing 126 key/lamp pairs.

D-channel messages are carried on the teleservice line 36 as sequential frames. Recommendation I.441 of the ISDN User-Network Interface Data Link Layer Specification refers to a frame format containing an information field and in which all frames start and end with a flag sequence consisting of one "0" bit followed by six contiguous "1" bits and one "0" bit. The flag preceding the address field is defined as the opening flag whereas the flag following a frame checking sequence (FCS) field is defined as the closing flag. The address field consists of two octets which identifies an intended receiver of a command frame and the transmitter of a response frame.

Figure 3:
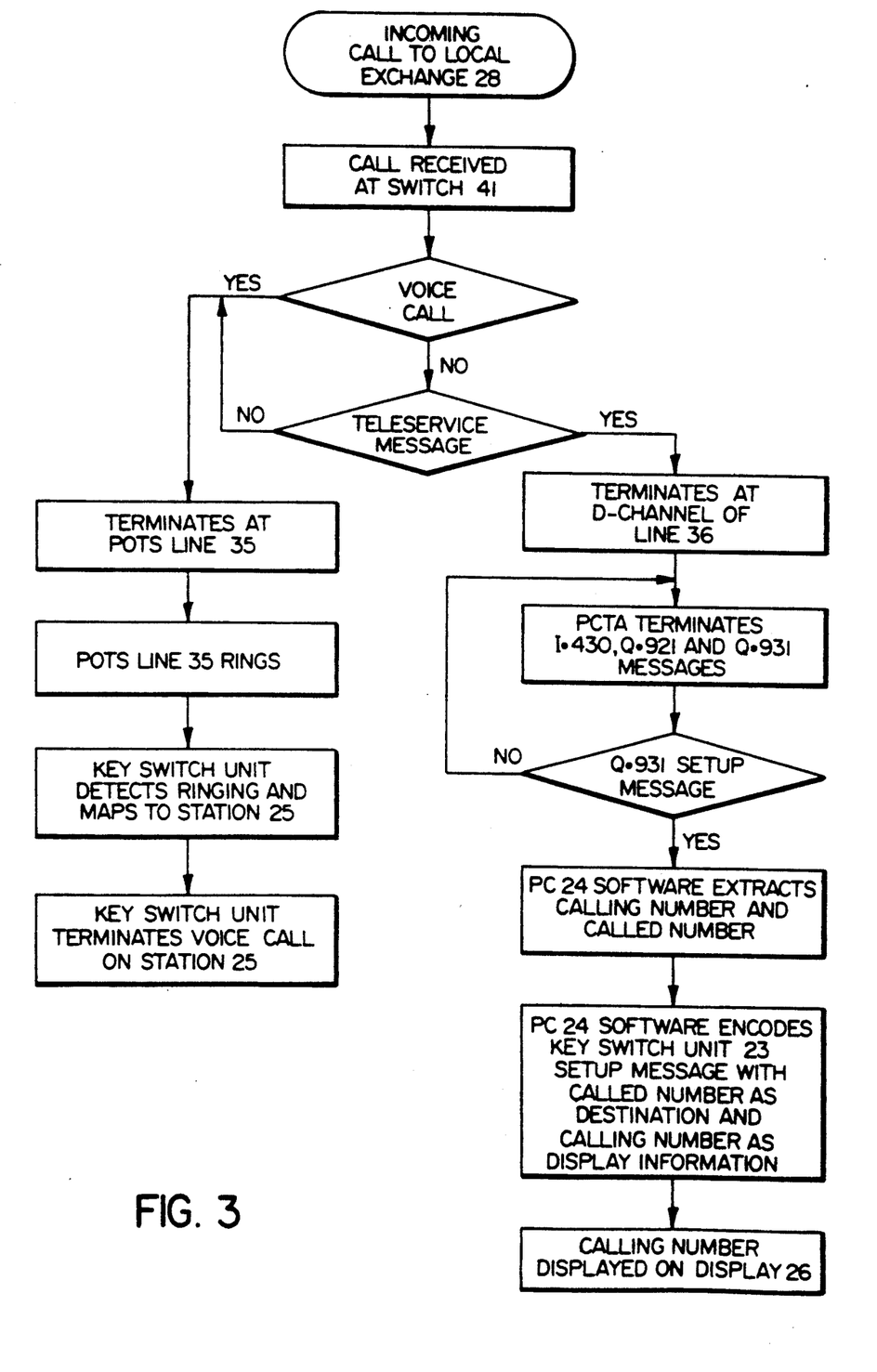
FIG. 3 is a flowchart illustrating a sequence of incoming call steps to establish connectivity between a key telephone system and a local telephone exchange in accordance with the invention.

A flowchart illustrating incoming call steps for establishing connectivity from the switch 41 to the KSU 23 appears in FIG. 3. Initially, the incoming call from the station 21 is received at the switch 41 which translates the called number and routes the call to the module 42 which configures the teleservice line 36 and a corresponding POTS line 35. Information sent to the line 36 includes the calling party number and the called party number. Concurrently, the POTS line 35 rings.

Following translation of the teleservice message output from the card 44, the KSU 23 detects the ringing POTS line 35 which is then mapped to the called station 25. At this point, the KSU 23 terminates the voice call on the station 25 to complete the connection.

Concurrent with voice call termination, the teleservice messages are terminated in the card 43 and are converted by the module 45 to teleservice messages which are output from the card 44 to the KSU 23. The calling number contained in the teleservice message is then displayed on the visual display 26 of the station 25.

Although the PC 24 may comprise any general purpose computer, it is preferably based on an IBM AT TM or XT TM computer or compatibles. The card 43 interfacing the teleservice line 36 is configurable by software to present either a Network (NT) or a Terminal (TE) interface to the exchange 28. By default, the card 43 is configured to present a NT interface.

Both cards 43 and 44 may be installed in any available expansion slots in the PC 24. The card 43 occupies the space of two slots and is set for the following configuration:

1. Interrupt Request Level: IRQ3
2. I/O address: 2F8-2FF
3. Interrupt vector: 0B
4. DMA channel: DRQ 1

The card 43 is available commercially from Northern Telecom Limited and is designed to drive an ISDN interface in a basic rate access mode.

The card 43 has the following characteristics:
1. Supports ISDN Layer 1 T-interface
2. Supports ISDN Layer 2 Q.921 multi-frame LAPD protocol
3. Provides an interface to Layer 3

Corresponding hardware for the card is known and consists of a microprocessor based subsystem, not shown, which is firmware/software driven. A known bootstrap ROM, not shown, provides immediate control of the card 43 after powerup. Program RAM, not shown, is downloaded from the PC 24 and provides flexible software control of the card 43 D-channel functions and protocols. Software for the card 43 is normally stored in a hard disk, not shown, of the PC 24 and is also downloaded to the card 43 after powerup.

The ISDN physical layer 1 of the card 43 is software configurable to either TE or NT mode, as previously discussed, and is used to match the equipment connected at the other end of the teleservice line 36, which in this embodiment comprises the exchange 28.

A current version of the card 43 employs a Zilog TM SCC chip as a high level data link controller which performs the function of the bottom ISDN sublayer of LAPD; this includes transmission and reception of the frames delimited by flags, bit stuffing and deletion, generation of FCS bytes, detection of FCS errors, and generation and detection of abort sequences and of residual bits.

Frames received by the card 43 are subsequently processed by the module 45 to provide protocol conversion compatible with the system 22. The converted frames are then processed by the card 44 and subsequently communicated to the KSU 23.

The status of the teleservice line 36 is first monitored by the card 43 software and is then conveyed to the PC 24 software. In the event that the ISDN physical layer 1 is out of synchronization with a clock 51 of the exchange 28, synchronization as well. After synchronization at the physical interface is recovered, synchronization at the card 43 is restored via a clock 53 of the PC 24.

Signaling by way of the D-channel on the line 36 can be used to extend access of the exchange 28 to the system 22 generally and specifically to download data relating to customer services from the exchange 28 to the system 22. Such data is stored in a data base of a ROM 52 in the switch 41. An example of typical services that can be extended from the exchange 28 to the system 22 are:
1. Calling line identification (CLID)
2. Calling party name display
3. Far End Disconnect
4. Far End Disconnect while Call Held CLID is the directory number of the station 21. Since all stations 25 in the system 22 are provided with displays 26, the directory number of the calling party is readily displayed at the station 25 that represents the called party. Thus, as a POTS line 35 of predetermined configuration rings, the CLID is received and processed in the PC 24 from whence it is forwarded to the display 26 of the predetermined station 25 of the called party.

The far end disconnect connectivity feature is currently not available to NORSTAR terminals because the POTS lines 35 do not receive an electrical disconnet signal when the calling party goes onhook. This limitation may now be overcome using the D-channel of the line 36. Thus, an indication of Far End Disconnect is now available by means of the present invention and is received on the teleservice line 36 during an active call. This feature is particularly useful in determining if the calling party is still present. Should the calling party place the call on hold, the display 26 at the corresponding station 25 accurately indicates a Call Active state In the event that the calling party loses a call during a transfer, the receiving party has a visual indication of the call being released at the far end. This action reduces the holding time on the line and provides directory number availability for an immediate call.

The Far End Disconnect while Call Held feature was likewise heretofore not available to the system 22 because the POTS lines 35 do not normally receive an electrical disconnect signal. This feature is especially useful when a station 25 places a call on hold and the far end station 21 disconnects. Prior to the advent of the present invention the station 25 would not be notified, and when the call was retrieved the user at the station 25 would eventually conclude that the call was abandoned. With the Far End Disconnect while Call Held feature, the station 25 is immediately informed of Far End Disconnect even while the call is held.

Unanswered Call Memory is a PC 24 subscribed feature that stores the calling directory number of any network call, as from the station 21 to a station 25, that goes unanswered. When an unanswered call is encountered, the calling directory number is stored in the PC 24. A system 22 Message Waiting indication is then activated to show that a network call has not been answered. A user at the called station 25 may then review the display 26 which shows the unanswered calls and subsequently return the calls using programmable keys at a station 25 keypad, not shown.

Calling Name Delivery is a display of the name associated with the calling station 21 directory number on the display 26 of a called station 25. The Directory Number to Name Directory is located in a RAM, not shown, of the PC 24. A known administration interface, not shown, is provided that allows a customer to enter both directory numbers and a names directory in the RAM of the PC 24.

Calling Line Identification is the directory number of the calling party displayed on station apparatus such as an Executive Business Set, not shown, having this capability. In the case of an originating call from a station 25, the Calling Party directory number is always provided by the switch 41 from its ROM 52. In the event that a station 25 has multiple directory numbers, the number displayed at the called end is the number from which the call was dialled. If the KSU 23 provides concentration, the directory number displayed is the number from whence the call originated and is not a primary directory number associated with the system 22.

The D-channel signaling between the system 22 and the exchange 28 will allow access to features digitally encoded and resident in the ROM 52 of the switch 41. This method allows features to be activated using the same user interface in the system 22 as opposed to dial access codes. Thus, the present invention is also capable of providing the following connectivity services:

1. Call Forward
2. Ring Again
3. Message Waiting
4. Direct Station Select (external to the KSU 23)

The objective of the foregoing services is to maintain the integrity of the system 22 user interface, i.e., NORSTAR, as depicted by the system 22 in FIG. 1, which has set a new standard for user interface by providing a full set of prompts. Therefore, by using the D-channel teleservice messaging along the line 36, feature status information can be shared between the switch 41 and the system 22, thus providing positive feedback to the user by way of prompts.

For Call Forward, Message Waiting and Ring Again features, there is currently only one key/lamp pair allowed per set for each feature. To satisfy a majority of users in the system 22, this may be increased to twelve key/lamp pairs per feature. This increase will allow configuration of a separate Call Forward and Message Waiting Indicator per directory number and a pool of Ring Again appearances for use by the system 22 users.

Call Forwarding is subscribed by means of a directory number stored in both the ROM 52 of the switch 41 and in the PC 24. The PC 24 also maps each Call Forward appearance to a predetermined one of the stations 25. Accordingly, each station 25 having the switch 41 Call Forwarding feature can forward calls outside of the KSU 23. An Active/Inactive indication is maintained by the PC 24, which in turn presents the status to the station 25. Each station 25 having the switch 41 call forwarding feature must have a dedicated Call Forward appearance in the switch 41. Software in the PC 24 is provided for the following functions:

1. mapping the switch 41 Call Forward appearance to a station 25;
2. providing user prompts for the switch 41 Call Forward Feature; and
3. distinguishing between user activation/deactivation of the internal system 22 versus an external switch 41 Call Forward feature This allows use of both features using a single key.

Figure 5:
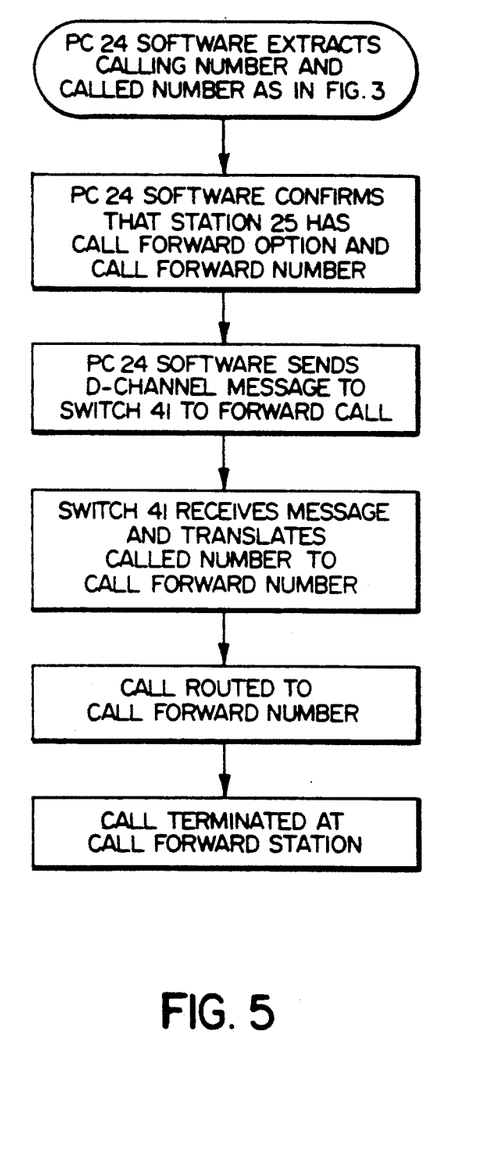
FIG. 5 is a flowchart illustrating a sequence of steps for establishing call forward connectivity in the system of FIG. 1.

Reference to FIG. 5 shows a flowchart of the various steps required to establish Call Forward connectivity between the system 22 and the switch 41. Moreover, by following the incoming call steps of FIG. 3 to establish connectivity between the switch 41 and the system 22, reference to FIG. 5 also shows the additional steps required for overall Call Forward connectivity beginning with the calling station 21.

Software in the PC 24 includes a record of all predetermined numbers to which individual ones of the stations 25 may forward their calls. As an illustrative example, the software in the PC 24 is arranged to send a D-channel message to the switch 41 with instructions to forward the call received by the station 25 to its predetermined Call Forward number. On receipt of the message at the exchange 28, the switch 41 accesses its ROM 52 and translates the call forwarded number followed by routing the call thereto. The final step is termination of the call at the station 21 corresponding to the call forwarded number.

Message Waiting is similarly subscribed by a directory number stored in both the ROM 52 and the PC 24. The PC 24 also maps each Message Waiting appearance to a station 25. Therefore, each station 25 having the switch 41 Message Waiting feature can leave and receive messages with other eligible stations under control of the switch 41. Since Message Waiting request and retrieval may only be accessed via access codes at present, it is required to provide key access to allow system 22 user prompts to be used.

Key access for Message Waiting will require two key/lamp pairs. In addition, it is necessary to remove the restriction that allows Message Waiting to be used only by the primary directory number on a BRA Stimulus set, such set being described in greater detail in the Robertson et al patent incorporated herein by reference.

An active/inactive indication for Message Waiting is maintained by the PC 24, which in turn presents the status to the station 25. Each station 25 having the Message Waiting feature requires a dedicated Message Waiting key/lamp pair in the switch 41 to enable the feature. Software in the PC 24 is provided to assert the following functions:

1. Map the switch 41 Message Waiting keys/lamp pairs to a station 25, and
2. Provide user prompts for the switch 41 Message waiting feature.

Since the system 22 Message Waiting feature is subtly different from that of the switch 41, it is not recommended that a single key h=used to consolidate both. Rather, they should remain separate.

Message Waiting software in the switch 41 provides access to the following connectivity features:

1. Call Request—leaving/retrieving messages for other eligible stations;
2. Message Centre—leaving/retrieving messages left at an attendant console used as a message centre;
3. Voice Messaging, (a)—a Voice Messaging product connected via an Ear and Mouth trunk on the switch 41; and
4. Voice Messaging, (b)—any Simplified Message Desk Interface compatible Voice Messaging product.

Figure 4:
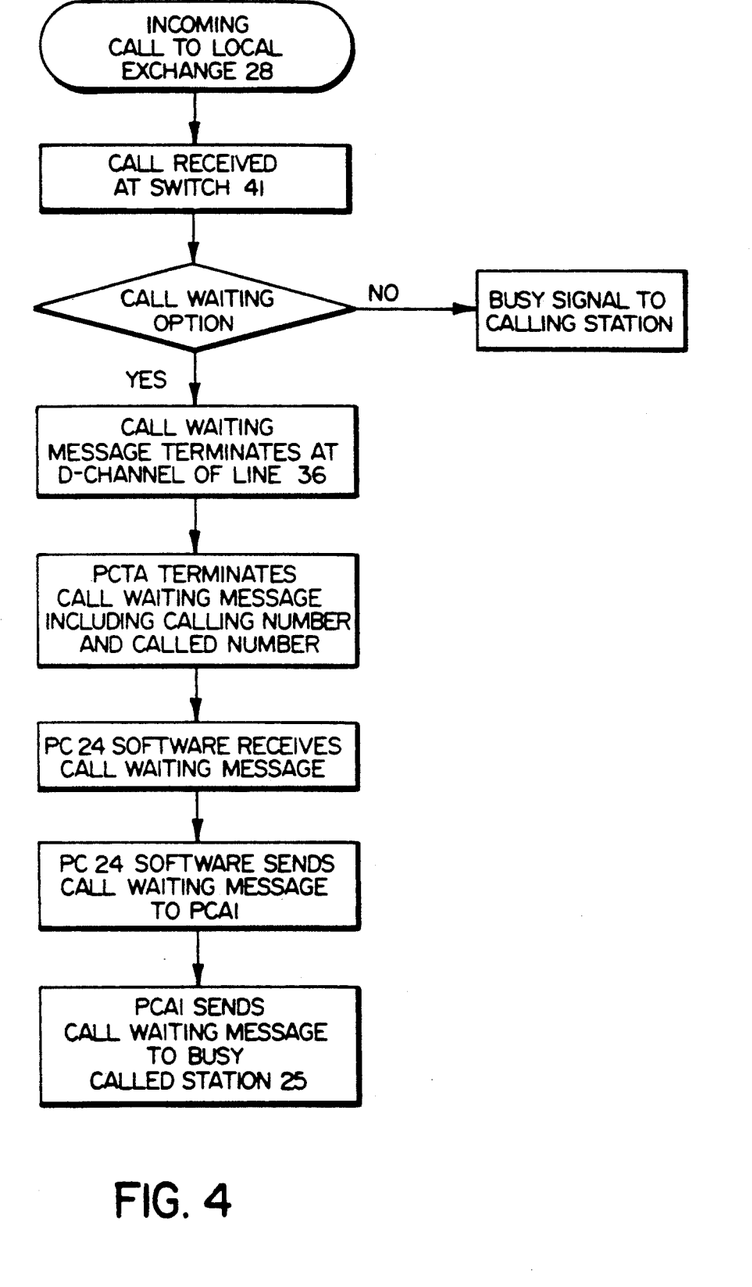
FIG. 4 is a flowchart illustrating a sequence of steps for establishing call waiting connectivity in the system of FIG. 1.

A flowchart in FIG. 4 illustrates the required steps to establish Call Waiting connectivity between the system 22 and the switch 41. Following receipt of an incoming call at the exchange 28 for the station 25, the switch 41 accesses its ROM 52 and translates the number for the station 25 having the call waiting option. The switch 41 then sends a Call Waiting message to the D-channel together with the calling number and called number, which are carried over the line 36 to the card 43. Software in the PC 24, in which is recorded the Call Waiting option for the station 25, receives the Call Waiting message. The received message then undergoes protocol conversion in the module 45, following which the converted message is relayed to the card 44. The Call Waiting message is sent therefrom via the KSU 23 to the busy station 25.

Ring Again appearances are subscribed via the module 42. These appearances can be viewed as a pool accessible from ROM 52 in the switch 41 by any station 25. To minimize user frustrations, however, it is recommended that each station 25 that subscribes to the switch 41 Ring Again access be given a dedicated Ring Again appearance. This will also simplify configuration of the feature on the PC 24.

Active/Inactive Indication is maintained by the PC 24 which in turn presents the status to a station 25. Software in the PC 24 provides the following functions:

1. Maps the switch 41 Ring Again appearance to a station 25;
2. Provides user prompts for the switch 41 Ring Again feature; and
3. Distinguishes between user activation/deactivation of the internal system 22 versus switch 41 Ring Again feature. This permits the use of both features using a single key.

Direct Station Select is a feature external to the KSU 23 and includes the following functions;

1. A lamp indication that tracks the activity of a directory number, and
2. One key that is used as an auto-dial key to directly access a station 25.

In the system 20 the Direct Station Select feature is supported within the KSU 23 only. It is possible to extend this feature to include directory numbers on the switch 41 by means of the following steps for each directory number that is identified as a Direct Station Select:

1. Configure the directory number in the switch 41 as a MADN that includes the original location of the directory number and its appearance on the D-channel loop. Unlike the directory numbers associated with the POTS lines 35 where there is a MADN member on the BRA interface and KSU analog central office lines, the Direct Station Select directory numbers have a MADN member only on the BRA D-channel interface. Other members of this MADN group may appear on other systems 22 or any switch 41 terminals.
2. Configure the directory number on the PC 24 such that the indicator status is mapped to a predetermined lamp, not shown, on its station 25.
3. Configure the corresponding key of the above-lamp for accessing the PC 24 to retrieve the directory number associated with the key/lamp pair.

For each of the foregoing features, the following activities will also be provided:

1. Switch 41 Service Orders;
2. PC 24 Configuration Tables;
3. PC 24 Audit to maintain status integrity of lamp indicators; and
4. System 22 Button Query to reflect Centrex use of the keys.

The embodiments of the invention hereinabove disclosed rely on block diagrams to describe certain apparatus and various circuit elements together with their respective functions. Similarly, software functions are depicted by flowcharts of predetermined functional steps that are followed to achieve desired performance from the equipment described. These diagrams represent certain hardware and software features that would be known to those skilled in the art to whom this specification is addressed, although not in the novel combinations disclosed. Accordingly, the foregoing constitutes a sufficient description to such individuals for a comprehensive understanding of the best mode to give effect to the embodiments as disclosed and claimed herein. Although program listings have not been included to disclose the precise manner of digital computer programming to perform the operations desired, the detailed functional description presented herein, together with related flowcharts, would permit a skilled computer programmer to program the PC 24 to perform all operations described.

To those skilled in the art to whom this specification is addressed, it will be apparent that the embodiments aforedescribed may be varied to meet particular specialized requirements without departing from the true spirit and scope of the invention disclosed. These embodiments are therefore not to be taken as indicative of the limits of the invention but rather as exemplary structures of the invention which is described by the claims appended hereto.

The embodiments of the invention in which an exclusive property or privilege is claimed are defined as follows:

1. A key telephone system having enhanced connectivity and which is operably responsive to selected ones of digitally encoded instruments resident in memory means of switch means disposed in a central data and voice communication facility, comprising in combination:
   an analog communications path having one end terminated at an analogy interface of the switch means and an opposite end terminated at a remote key switch unit having a visual display;
   a digital communications path having one end terminated at a digital interface of the switch means and an opposite end terminated at a remote digital communications port of the key switch unit;
   means for accessing the memory means and downloading selected ones of the digitally encoded instructions to the digital communications port; and
   control means communicating with the digital communications port and being operably responsive to the downloaded instructions input thereto for enabling the key switch unit with corresponding service connectivity features and visually displaying the features on the visual display.

2. A system as claimed in claim 1, wherein the key switch unit includes a plurality of communication ports and the key telephone system further comprises a corresponding plurality of subscriber stations connected to the ports.

3. A system as claimed in claim 2, wherein the control means comprises a microprocessor including memory means for storing the digital encoded instructions downloaded from the memory means of the switching means and programmed instructions for effecting signaling and supervisory communications between the system and the central data and voice communication facility.

4. A system as claimed in claim 3, wherein the switch means comprises an ISDN switch and the digital communications path comprises exclusively an ISDN basic rate access 0B+D teleservice channel 5. A system as claimed in claim 4, wherein the microprocessor further comprises clock means for synchronously executing the downloaded instructions with corresponding clock means in the ISDN switch.

6. A system as claimed in claim 5, wherein the teleservice channel is bidirectional to permit half duplex teleservice communication between the ISDN switch and the microprocessor.

7. A system as claimed in claim 6, further comprising key switch means disposed at predetermined ones of the subscriber stations for originating connectivity services therefrom by accessing such services stored as digitally encoded instruction sets in the memory of the ISDN switch.

8. A system as claimed in claim 7, further comprising means for mapping a call appearance on the teleservice channel into a line appearance on the visual display disposed at individual ones of the subscriber stations.

9. A system as claimed in claim 8, wherein the key switch unit is operably responsive to a predetermined proprietary protocol and further comprising means for converting the downloaded digitally encoded instructions from an ISDN protocol to the predetermined proprietary protocol for enabling the key switch unit.

10. A key telephone system having enhanced connectivity and which is operably responsive to selected ones of digitally encoded instructions resident in memory means of switch means disposed in a central data and voice communication facility, comprising in combination:
    an analog communications path having a proximate end terminated at an analog interface of the switch means and a distal end terminated at a corresponding interface of key switch means;
    a digital communications path having a proximate end terminated at a digital interface of the switch means and a distal end terminated at a digital communications port of the key switch means;
    means for accessing the memory means and downloading selected ones of the digitally encoded instructions to the digital communications port; and
    control means communicating the port with a control input of the key switch means and being operably responsive to the instructions downloaded from the memory means for enabling the key switch means with corresponding service connectivity features.

11. A system as claimed in claim 10, wherein the key switch means includes display means operably responsive to individual ones of control inputs from the control means for visually displaying the corresponding enabled service connectivity features of the key switch means.

12. A system as claimed in claim 11, wherein the control means comprises a microprocessor including memory means for storing the digitally encoded instructions downloaded from the memory means of the switching means and programmed instructions for effecting signaling and supervisory communications between the system and the central data and voice communication facility.

13. A system as claimed in claim 12, wherein the key switch means includes a plurality of communication ports and the key telephone system further comprises a corresponding plurality of subscriber stations connected to the ports.

14. A method for providing enhanced connectivity features in a key telephone system, wherein the features are operably responsive to selected ones of digitally encoded instructions resident in memory means of switch means disposed in a central data and voice communication facility, comprising the steps of:
    establishing an analog communications path having one end terminated at an analog interface of the switch means and an opposite end terminated at a remote key switch unit having a visual display;
    establishing a digital communications path having one end terminated at a digital interface of the switch means and an opposite end terminated at a remote display communications port of the key switch unit;
    accessing the memory means and downloading selected ones of the digitally encoded instructions to the digital communications port;
    communicating the digital communications port with an enabling input of processor means;
    communicating a controlling output of the processor means with an enabling input of the key switch unit; and
    applying digitally encoded instructions downloaded from the switch means to the processor means for enabling the key switch unit with corresponding service connectivity features and visually displaying the same on the visual display.

15. The method as claimed in claim 14, comprising a preliminary step of converting the downloaded digitally encoded instructions from an ISDN protocol to a predetermined proprietary protocol to which the key switch unit is operably responsive.

16. The method as claimed in claim 15, comprising a further step of storing digitally encoded instructions downloaded from the memory means of the switching means and programmed instructions for effecting signaling and supervisory communications between the system and the central data and voice communication facility.

* * * * *